United States Patent [19]

Russo

[11] Patent Number: 5,538,108
[45] Date of Patent: Jul. 23, 1996

[54] PAD FOR DISC BRAKES WITH SINTERED FRICTION ELEMENTS

[75] Inventor: Sergio Russo, Aiello Del Sabato, Italy

[73] Assignee: Frendo S.p.A., Italy

[21] Appl. No.: 217,623

[22] Filed: Mar. 25, 1994

[30] Foreign Application Priority Data

Apr. 5, 1993 [IT] Italy ................................. RM93A0206

[51] Int. Cl.[6] ................................................. F16D 69/04
[52] U.S. Cl. ................................. 188/250 E; 188/250 B; 192/107 C
[58] Field of Search .......................... 188/250 B, 250 E, 188/250 G, 250 R, 73.1; 192/107 C, 107 R, 107 M

[56] References Cited

U.S. PATENT DOCUMENTS

| | | | |
|---|---|---|---|
| 2,299,028 | 10/1942 | Nutt et al. ............................ | 192/107 C |
| 3,297,117 | 1/1967 | Freholm ................................ | 188/250 B |
| 4,501,347 | 2/1985 | Cerny et al. .......................... | 188/250 G |
| 4,640,390 | 2/1987 | Saumweber et al. ............. | 188/250 B X |
| 4,823,921 | 4/1989 | Bosco ................................... | 188/250 B |

FOREIGN PATENT DOCUMENTS

| | | | |
|---|---|---|---|
| 0102469 | 3/1984 | European Pat. Off. . | |
| 0106782 | 4/1984 | European Pat. Off. . | |
| 0128276 | 12/1984 | European Pat. Off. . | |
| 0263752 | 4/1988 | European Pat. Off. . | |
| 0336465 | 10/1989 | European Pat. Off. ........... | 188/250 B |
| 508423 | 10/1992 | European Pat. Off. ........... | 188/250 E |
| 2611012 | 8/1988 | France ............................... | 188/250 B |
| 8514607 | 7/1985 | Germany . | |
| 1626014 | 2/1991 | U.S.S.R. ............................ | 188/250 B |

*Primary Examiner*—Lee Young
*Attorney, Agent, or Firm*—Samuels, Gauthier, Stevens & Reppert

[57] ABSTRACT

It is proposed to mount single, cylindrical or polyhedron sintered friction elements (1) at the cantilevered ends of resilient metal plates (2); the metal plates are attached to a base platen (3) in such a way that each end of the plates acts as an independently movable bracket adapted to absorb any deformation induced by thermal forces, thereby enabling a uniform contact pressure to be exerted between the single friction elements and the brake disc.

7 Claims, 3 Drawing Sheets

PAD FOR DISC BRAKES WITH SINTERED FRICTION ELEMENTS

This invention relates to the broad field of the pads for disc brakes for railway vehicles and for heavy duty transport vehicles and, more particularly, it relates to such a pad comprising a bearing platen acting as a metal support whereupon individual sintered friction elements are mounted.

The pads for disc brakes of the above mentioned type are per se known. The friction elements mounted on said pads can be cylindrical or polyhedron shaped with polygonal cross-section. The subdivision of the friction surface into a plurality of individual friction elements is designed in order to achieve a better heat distribution on the counter face (disc) so as to prevent heat concentration spots that can result into breakages of the counter face itself. The high temperatures of even more than 600° C. generated during braking in severe conditions can result into deformations of the bearing platen with subsequent uneven pressure on the individual friction elements: this entails local overheating, higher wear of the discs and of the elements, as well as, in more severe conditions, the formation of so-called fire bands.

Aiming at overcoming these drawbacks, it has been proposed to mount the friction elements upon a flexible plate attached, in turn, along a perimetral line, to a bearing platen, by means of rivets with spacer supports (EP-B-0106782). Also this flexible plate, however, in operation at high temperatures, was amenable to be deformed, with resulting uneven pressure on the individual elements. The bearing platen, on the contrary, is protected from the high temperature influences as a result of a better aeration.

It has been proposed, therefore, to interpose, between the individual elements and the base platen, cup springs in prestressed condition and to guide the movements of the elements by means of an apertured plate attached, in turn, to the base platen by means of rivets and suitably spaced therefrom. While braking, the individual friction elements are free to slide in a perpendicular direction with respect to the support, thereby assuring much more uniform contact pressures (DE.GM-85 14 607.2). It has been ascertained that, anyway, the operativeness of such a construction is rather scarce, due to the fact that said cup springs are amenable to be so strongly heated as to be deformed under pressure and to completely lose their resiliency. Furthermore, the powder itself generated by wear of the pads and the formation of dirt and rust result in a short time into a complete loss of mobility of the individual friction elements.

In European Patent EP-B-0263752 it has been proposed to mount three friction elements upon rigid plates, which are barycentrically mounted upon a guide platen and are connected to the bearing platen by means of hydraulic piston members, free to slide in a gasket holder. By this system, a noticeably uniform pressure is obtained, but the construction has been found to be very difficult to be manufactured and extremely expensive, from an industrial view point.

The need exists, therefore, to develop a pad for disc brakes of the above outlined kind, by which a uniform pressure of the friction elements upon the brake disc can be achieved.

According to this invention, this problem has been solved by mounting the individual friction elements combined into small groups upon steel plates, resiliently deformable also at high temperature. Such elements are attached to the freely movable ends of said plates which, in turn, are attached at some distance upon a base bearing platen.

The individual sintered friction elements can be provided, in turn, with a metal support, for instance a metal base plate, and/or they can be housed in a metal container. The attachment of said sintered friction elements without supports upon the plates can be effected by riveting, sintering, welding or brazing. The attachment points of said plates upon the base platen are located between the friction elements, in order that these elements are placed at the freely movable ends of the same. Furthermore, it is possible to interpose between the plate ends and the base platen layers of heat stable insulation material, such as a tridimensional fibrous structure, bound with an organic binder, adapted to damp and even to absorb excessive vibrations. Should it be necessary, if the concerned individual friction element are provided with a base plate, then they can be affixed to the steel plate by means of rivets, possibly with interposition of an insulating and damping, heat stable layer, as above explained.

The attachment of the plates to the base platen can be effected by riveting or welding, upon interposition of suitable spacers: anyway, detachable connections are preferred, for instance screwed or clamped connections, in order to make the reuse of the base platens possible and easy.

The number of the friction elements that can be mounted upon a single plate is variable as a function of their cross-section and according to the requirement that such elements be arranged as uniformly as possible with respect to the diametral line of the base bearing platen: the higher is the number of the elements upon the steel platen, the larger will be the free area at the centre of the platen, thereby minimising the total useful surface. By this reason, rarely more than six elements are arranged upon the plate. Arrangements comprising groups of two or three elements each having a surface area of about 8 $cm^2$ are preferred. When such arrangements comprise more than two elements, the steel plates can be provided with slots or other type of cut-outs starting from the edges or from the centre of the plates along a direction toward the attachment points. By this means the flexibility of the plate itself is improved.

When friction elements of polygonal cross-section are used, it is convenient that such elements be mounted upon the steel plate, at least as far as their front or attack zone is concerned, in such a way that, in operation condition, each of them has a side that is orthogonal to the rotation direction of the disc, that is to its radial direction: this arrangement, in fact, has been found to be very useful, when the vehicle is braked in wet conditions, to break down the water film which forms on the disc.

The plates are mainly made of stainless steel, with addition of a particular thermal hardening and tempering treatment at temperatures higher than the temperatures reached during the worst condition operation: this treatment is used in order to prevent annealing phenomena resulting into a loss of resiliency:

Further particulars and advantages of this invention will be evident from the following description with reference to enclosed drawings wherein the preferred embodiments are shown by way of illustration and not by way of limitation.

Figure 1:
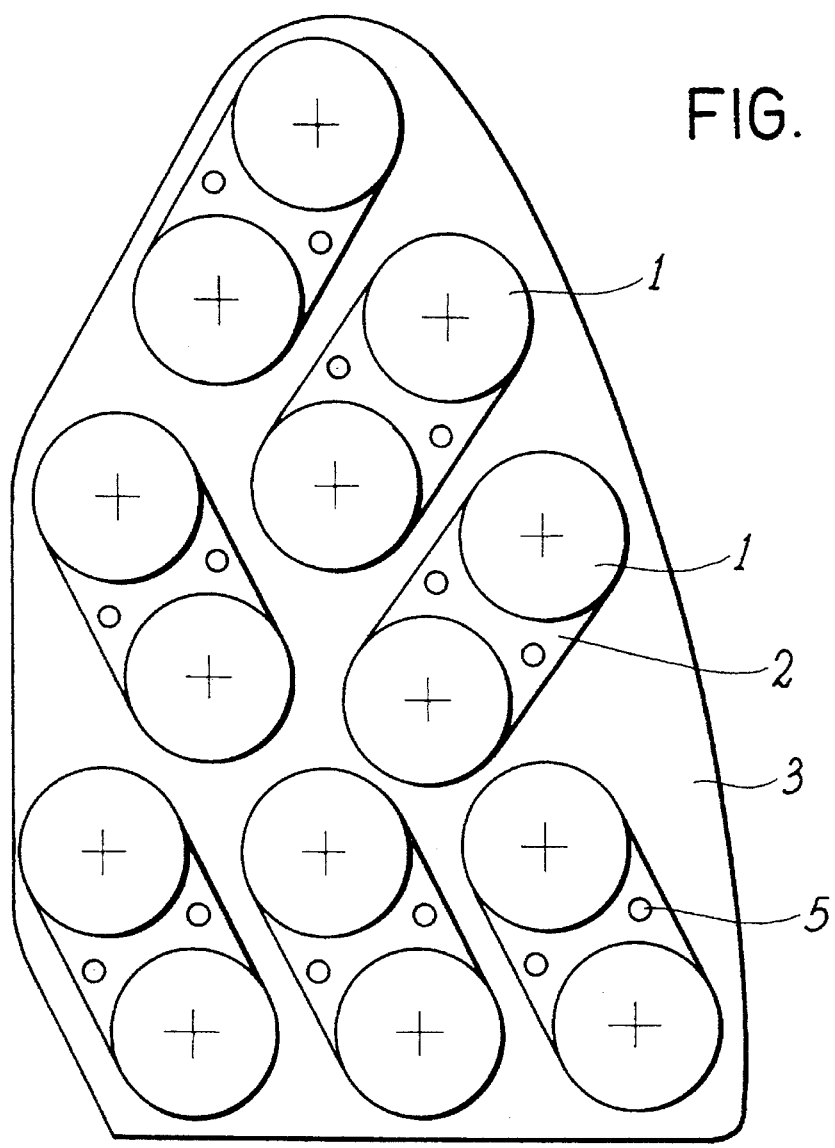
FIG. 1 shows the contact surface of a pad characterized by metal plates each bearing two sintered friction elements.
Figure 2:
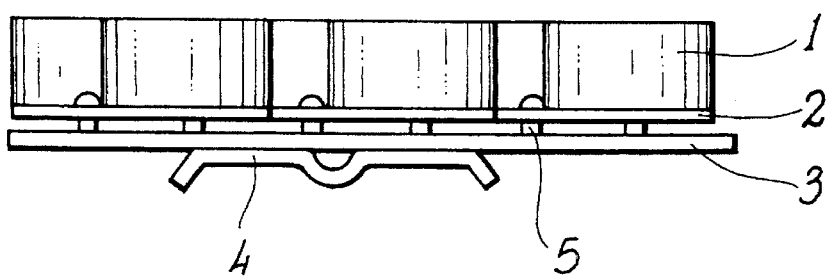
FIG. 2 shows a front view of the pad of FIG. 1.

Referring now to FIGS. 1 and 2 of the drawings, it can be observed that the sintered friction elements 1, of circular cross-section, are arranged in pairs and are riveted at their bottom to the ends of steel metal plates 2; such rivet attachment being carried out by using the usual metal support forming the bottom of the friction element 1.

Metal plate 2 is attached to the base platen 3 by means of suitable steel rivets, upon interposition of suitable spacers 5, these spacers being also made of steel and possibly manufactured integrally with the rivets. The connection between the metal plates 2 and the base bearing platen 3 lies on the symmetry axis of the plates between two friction elements, so as to divide the relevant plate into two brackets. The arrangement of the plates 2 upon the base platen 3 has been designed in this way in order to optimise the friction coefficient performance in wet conditions and in order to achieve a wear of the friction elements as much uniform as possible, even with different peripheral slipping velocities.

As it can be observed in the front view of the pad of FIG. 2, the pad is provided with a dovetail portion 4 which enables the pad to be mounted in the gasket holder; such dovetail portion 4 is attached to the base platen 3 by riveting or welding. It has been found by means of working tests carried out according to OREB 126,3 type V.I.C. by means of six thermo-couples, even on braking from a speed of 320 km/hour, were never higher than 400° C., which temperatures are much lower than the temperature detected on comparable pads according to European Patent EP-B-0 106 782.

The friction coefficient is noticeably more consistent as a function both of the contact pressure and of the speed and also the wear coefficients are better. This means that a uniform contact pressure between the individual friction elements and the disc is achieved by a pad for disc brakes according to this invention.

Figure 3:
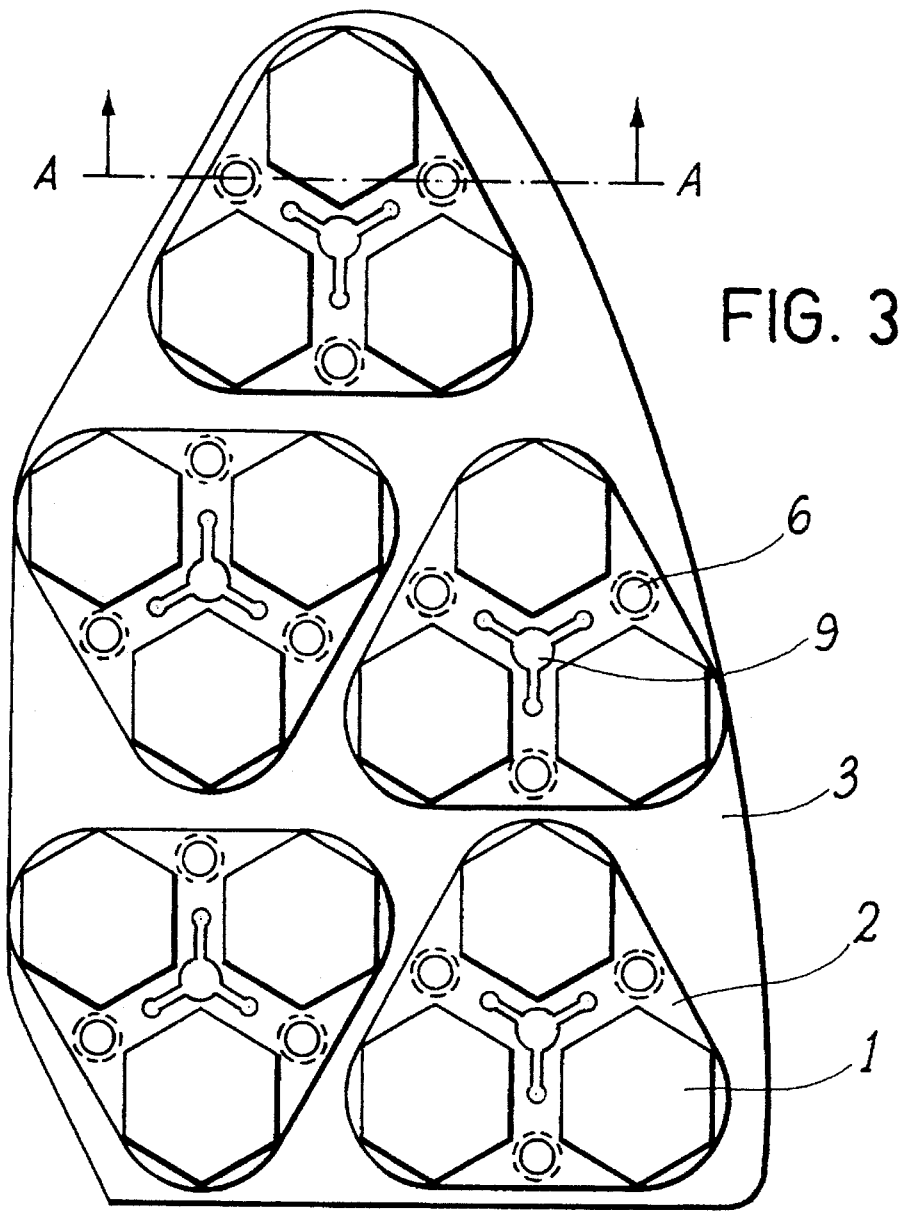
FIG. 3 shows a pad characterized by metal plates each bearing three sintered friction elements.

The pad for disc brakes as shown in FIG. 3 exhibits the same good performance characteristics. In this embodiment, three sintered friction elements of hexagonal shape are attached by means of suitable rivets to steel plates 2 having the shape of an equilateral triangle with rounded apexes. The friction elements I are arranged at the apexes of the triangle upon the bisecting line, while the attachment rivets 6 are arranged at the opposed sides. At the centre of the plate, an aperture 9 is provided having cut-outs extending toward the rivets 6. In this embodiment, the plate is divided into three brackets, independently movable with respect to one another.

The steel plates 2 are arranged on the base platen 3 in such a way that the sides of the friction elements are orthogonal to the rotation direction of the disc (not shown).

Figure 4:
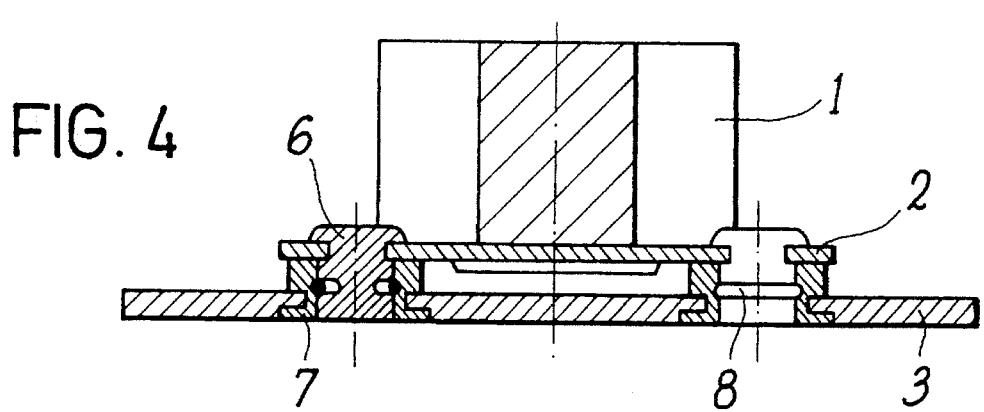
FIG. 4 shows one of the many possible clamping means for mounting the metal plates to the base bearing platen.

As alternative solution with respect to riveting, the above described steel plates 2 can be removably attached to the base platen 3, as shown by cross-section A—A of FIG. 4. A suitable apertured attachment spacer 7 within which a circular groove is cut is riveted to the base bearing platen 3. Three attachment pins 6 also provided with circular grooves are attached to the metal plate 2. At the assembling stage, a resilient heat stable washer 8 is inserted into the circular groove of the attachment pins 6 and each attachment pin 6 is force fit inserted into the related spacer 7 up to the point at which the resilient washer 8 snaps into the groove of the spacer 7. Since such a connection is not required to withstand traction forces, but only compression forces and shear forces, this easily detachable type connection to attach a steel plate 2 to a bearing plate 3 has been found to be particularly convenient and permits an easy replacement of the related friction elements.

Figure 5:
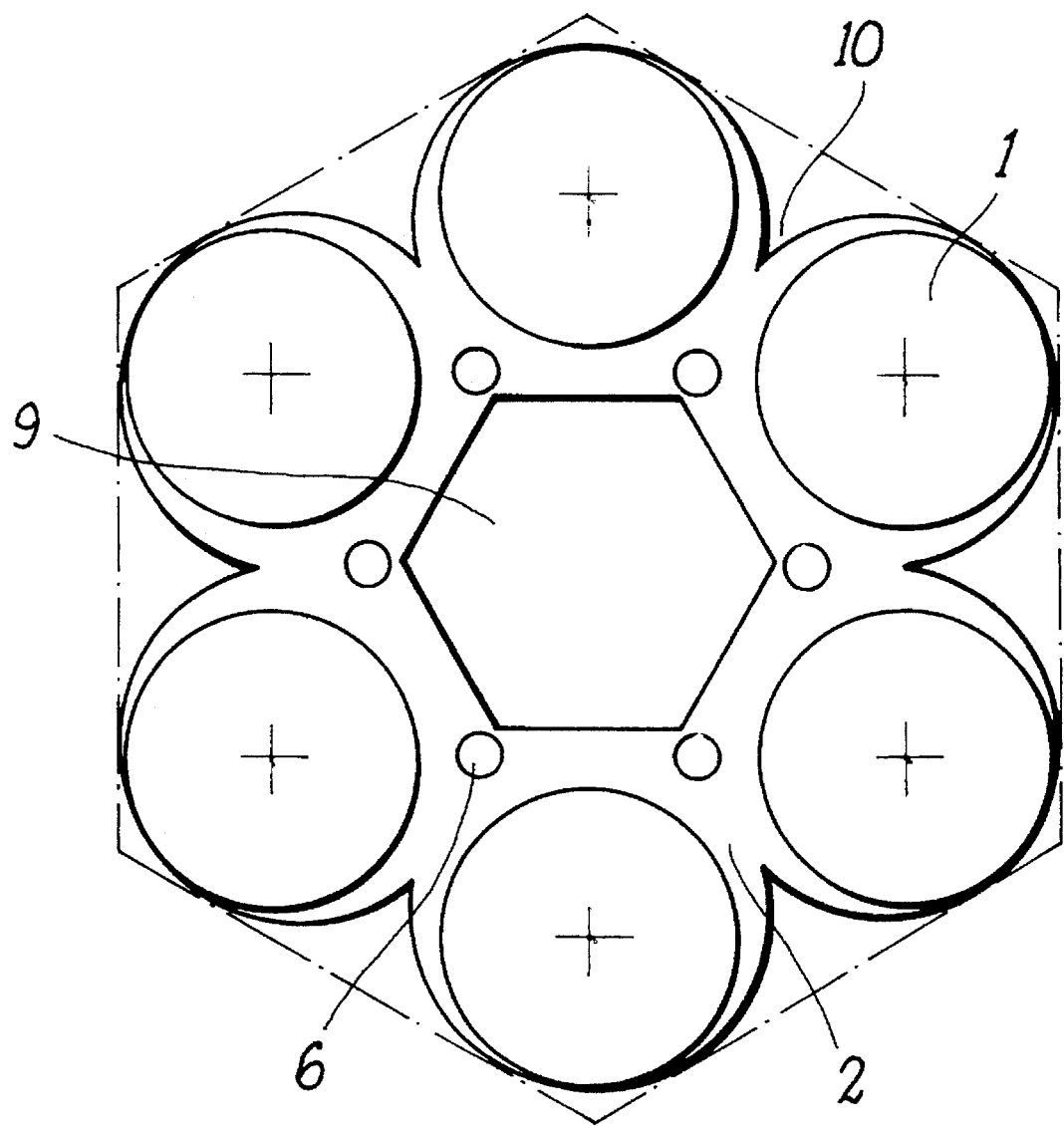
FIG. 5 shows a metal plate bearing six sintered friction elements.

Since the number of friction elements to be mounted on a plate is not necessarily three, an embodiment wherein six friction elements 1 are mounted on each plate 2 is shown in FIG. 5: to this effect, the concerned plate has a hexalobated shape. The cylindrical or polygonal friction elements 1 are mounted at the apexes or in the lobes of plate 2. The attachment rivets 6 are arranged on the intermediate line between the sides of the hexagonal shape of the plate 2 and along a circumference inscribed within the array of the friction elements 1. Between the lobes of the metal plate 2, cut-outs are symmetrically provided, having their apexes extending toward the attachment pins 6. Plate 2 has also a central aperture 9 which is also shaped as a regular hexagon, but it is offset at 30° with respect to the lobes of said metal plate 2, so that its apexes are extended toward the attachment pins 6. In this manner, the metal plate 2 is divided into six brackets independently movable with respect to one another.

I claim:

1. A pad for disc brakes comprising a metal base bearing platen (3) upon which metal plates (2) are attached to support individual sintered friction elements (1), characterized in that said metal plates (2) are attached spaced apart from one another to said bearing platen (3) by means of attachment pins (5, 6) so as to form cantilever flexible brackets independently movable with respect to one another, adapted to resiliently absorb deformation caused as a consequence of high temperatures, and said individual friction elements (1), divided into small groups, are mounted upon cantilevered, freely movable ends of said brackets.

2. A pad for disc brakes according to claim 1, characterized in that two or three friction elements (1) are attached to said metal plates (2).

3. A pad for disc brakes according to claim 2, characterized in that said friction elements (1) are riveted to said metal plates (2) by means of a metal support.

4. A pad for disc brakes according to claim 1, characterized in that said metal plates (2) are provided with apertures (9, 10) in the center which extend toward said attachment pins (5, 6).

5. A pad for disc brakes according to claim 1, characterized in that said metal plates (2) are removably mounted upon said base bearing platen (3).

6. A pad for disc brakes according to claim 5, characterized in that, for attachment of said plates (2), a suitable apertured spacer (7) is riveted to said base platen (3) and a circular groove is provided therein, said attachment pins (6) are riveted to said plates (2), a circular groove is also provided in the external surface of pins (6) and resilient heat stable washer (8) is inserted into the circular groove of the pins (6), so that, during the mounting stage, said attachment pins (6) are force fit inserted into said spacers (7) up to the point at which the resilient washers (8) snap into the grooves in said spacers (7).

7. A pad for disc brakes comprising a metal base bearing platen (3) upon which metal plates (2) are removably mounted to support individual sintered friction elements (1), characterized in that said metal plates (2) are attached spaced apart from one another to said bearing platen (3) by means of attachment pins (5, 6) so as to form cantilever flexible brackets independently movable with respect to one another, adapted to resiliently absorb deformation caused as a consequence of high temperatures; said individual friction elements (1), divided into small groups, are mounted upon cantilevered, freely movable ends of said brackets; wherein for attachment of said plates (2), a suitable apertured spacer (7) is riveted to said base platen (3) and a circular groove is provided therein, said attachment pins (6) are riveted to said plates (2), a circular groove is also provided in the external surface of pins (6) and resilient heat stable washer (8) is inserted into the circular groove of the pins (6), so that, during the mounting stage, said attachment pins (6) are force fit inserted into said spacers (7) up to the point at which the resilient washers (8) snap into the grooves in said spacers (7).

* * * * *